United States Patent Office 3,549,525
Patented Dec. 22, 1970

3,549,525
PARTIALLY DEACTIVATED SILICON DIOXIDE ADSORBENTS AND METHOD
Knut Klatyk, Darmstadt, Germany, assignor to E. Merck Aktiengesellschaft, Darmstadt, Germany
No Drawing. Filed Aug. 20, 1969, Ser. No. 851,756
Claims priority, application Germany, Aug. 24, 1968, 1,798,116
Int. Cl. B01d *15/08*
U.S. Cl. 210—31
12 Claims

ABSTRACT OF THE DISCLOSURE

Partially deactivated silicon dioxide-containing adsorbents are produced by coating the surfaces of a surface active silicon dioxide-containing adsorbent with polyvinylpyrrolidone. The adsorbents are especially useful as chromatographic agents in the separation of proteins and the like from aqueous dispersions, said proteins being normally irreversibly adsorbed unmodified silicon dioxide-containing adsorbents.

BACKGROUND OF THE INVENTION

This invention relates to silicon dioxide-containing adsorbents, more particularly to such adsorbents whose surface active properties have been modified to permit their use as chromatographic adsorbents for special applications.

Adsorbents comprising silicon dioxide are widely used for the separation of mixtures, both in the liquid and gaseous phases. The separating properties of these adsorbents depend, inter alia, on the number and type of the adsorption-active centers of the adsorbent, such centers being, for example, hydroxyl groups bound to the surface silicon atoms. These adsorption-active centers interact at different strengths with the various components of the mixture to be separated, thereby making separation possible as the components are then selectively eluted from the adsorbent. However, troublesome interactions sometimes occur. For example in the chromatographic separation of biochemicals, e.g. proteins and polypeptides, including enzymes, coenzymes, antigens, vaccines, serums, blood fractions, antitoxins, toxoids, etc., and other sensitive materials, e.g. antibiotics, one or several of such components are completely or partially irreversibly adsorbed on the adsorbent, or upon elution are precipitated or altered so they cannot be eluted without undesired chemical and/or physical changes therein.

Consequently, it would be desirable if the absorption-active centers of such adsorbents could be modified so that such interfering interactions are essentially eliminated, but the separative effect is retained.

It is known that such undesired interactions between the substrate and the adsorbent are avoided when silanized adsorbents are employed. By silanization of the adsorbent, the hydrogen atoms of the hydroxyl groups present on the surface thereof which are bound to the silicon atoms are replaced by organosilicon residues, e.g. trimethylsilyl groups by reaction with an organosilicon compound, e.g. trimethylsilyl chloride. However, when silanized adsorbents are used as separating agents, they have the disadvantages of being hydrophobic and thus cannot be used when the multiple-component system is in an aqueous or water-containing organic phase, which is usually the case with biochemicals.

As further but less pertinent background for this invention, it is to be noted that it is conventional to employ, for the separation of phenolic compounds by thin layer chromatography, a polyvinylpyrrolidone which is insoluble in water and in most organic solvents as a result of cross-linking (Journal of Chromatography, vol. 34, pp. 52–58 (1968)). A preparation of water-insoluble polyvinylpyrrolidone and synthetic calcium silicate has been used to clarify beverages, such as beer, wine, and fruit juices. In combination with iodine, it has been used to sterilize aqueous solutions (U.S. Pat. 3,216,579). In each of these uses, the objective was to utilize the properties of the polyvinylpyrrolidone itself. In none of the prior art uses was polyvinylpyrrolidone used to improve the properties of a silicon dioxide-containing adsorbent for chromatographic purposes.

SUMMARY OF THE INVENTION

It has now been discovered that the above-described undesired interactions between the substrate and the separating agent can be substantially or completely eliminated by coating the surfaces of the silicon dioxide-containing adsorbent with a thin layer of polyvinylpyrrolidone.

Thus, a principal object of this invention relates to silicon dioxide-containing adsorbents partially deactivated by a surface coating of a thin layer of polyvinylpyrrolidone and more particularly to chromatographic separating agents which utilize such adsorbents as substrate materials.

Another object of this invention relates to a process for the preparation of silicon dioxide-containing chromatographic separating agents which comprises coating the surface of these adsorbents with a thin layer of polyvinylpyrrolidone.

A still further object relates to a process for the chromatographic separation of mixtures containing a component desired to be isolated therefrom which is sensitive to silicon dioxide-containing adsorbents which utilizes a polyvinylpyrrolidone coated silicon dioxide-containing adsorbent as substrate material.

Upon further study of the specification and claims other objects and advantages of the present invention will become apparent.

DETAILED DESCRIPTION OF THE INVENTION

The starting material for producing a chromatographic separating agent according to the invention is a surface active silicon dioxide-containing adsorbent substrate material, the average pore diameter of such adsorbents generally being between 5 and 5,000 A., particularly between 15 and 4,000 A., preferably between 50 and 3,000 A.

Suitable silicon dioxide-containing substrate starting materials which can be used include silica gel, kieselguhr and porous glasses. As used herein, the term silicon dioxide includes insoluble salts thereof, e.g. the silicates including calcium or magnesium silicates. Silica gel is a preferred adsorbent.

The polyvinylpyrrolidones which are used to modify the adsorbent substrate material are those whose polymer size has correspondence with the average pore diameter of the adsorbent. In other words, it is preferred that adsorbents which have small pore diameters are coated with polymers having a low average degree of polymerisation; however, it is possible to employ polymers having K values of about 11 to 90, irrespective of the average pore diameter of the adsorbent.

The so-called K value of polymers gives an indication of the average degree of polymerization of the polyvinylpyrrolidone, which K value can be determined experimentally from the viscosity of a solution of the polyvinylpyrrolidone according to the Equations 1 and 2:

$$K = 1000 \cdot k \quad (1)$$

$$\log \frac{\eta}{\eta_0} = c \left( \frac{75 k^2}{1 + 1.5 \cdot k \cdot c} + k \right) \quad (2)$$

wherein

η is the viscosity of the polyvinylpyrrolidone solution;
π₀ is the viscosity of the pure solvent; and
c is the quantity of dissolved polyvinylpyrrolidone in grams per 100 ml. of solution.

Polyvinylpyrrolidones which can be employed for producing in the separating agents of this invention are those having K values of between about 11 and 90, preferably between 17 and 25.

In carrying out the process of this invention for producing the novel, partially deactivated adsorbents, the selected silicon-containing adsorbent is coated as uniformly as possible, with the selected polyvinyl pyrrolidone. This is preferably done by having the substrate material adsorb the polymer one or more times from a solution of the polyvinylpyrrolidone, removing any excess by washing with pure solvent and finally drying the washed product.

The resulting coated adsorbent is partially deactivated, i.e. its adsorbent properties have been altered.

This alteration or selective deactivation generally can be effected by a monomolecular layer of polyvinylpyrrolidone.

The layer of polyvinylpyrrolidone is employed to cover substantially all (e.g. at least about 70%, preferably at least about 85%, if not all) of the surface area of the adsorbent. The thickness of the layer is at least monomolecular on the average and not so thick as to impair the activity of the base adsorbent. Thus, the average thickness of the polyvinylpyrrolidone is preferably about 3 to 30 A. and especially 3 to 15 A. By being coated with such a layer, the pore volume of the adsorbents having average pore diameters between 50 and 5000 A. remains practically unchanged, i.e., no pores are clogged by the polymer. The pore volumes of adsorbents having average pore diameters of less than 50 A. are decreased markedly, whereby, however, the separative power of the adsorbent is not affected to such a degree. Without being bound by an explanation of the mechanism of the invention, the polyvinylpyrrolidone coating appears to prevent direct chemical interaction of a sensitive substrate with the active centers of the adsorbent without substantially impairing the electrostatic interaction between polar portions of the substrate molecule and the active centers of the adsorbent.

The chromatographic adsorbents of this invention usually have a particle size of from 1 to 1000, preferably 5 to 800 microns.

The uncoated adsorbents have a specific surface generally in the range of 3 to 1000, preferably 10 to 800 m.²/g.

As stated above, a coating of the surface of the substrate with the polymer which is about monomolecular is of special advantage. The separating agents of this invention are preferably coated with 0.1–15% by weight, more preferably 1–10% by weight, of polyvinylpyrrolidone.

To coat the starting adsorbent, it is mixed with a solution of the selected polyvinylpyrrolidine in a solvent therefore, e.g. at a concentration of 1–25 g., preferably 4–8 g., per 100 ml. of solution. The substrate material is preferably added to an excess of this solution. Suitable solvents for the polyvinylpyrrolidine are water and organic solvents which are relatively inert to the substrate, i.e. which are not more strongly adsorbed by the substrate material than the polyvinylpyrrolidone, and in which the polyvinylpyrrolidone is soluble. Suitable organic solvents are, for example, lower mono- or polyhydric aliphatic alcohols, e.g. methanol, ethanol, isopropanol, butanol, ethylene glycol, and propylene glycol; ketones, e.g. acetone and methyl ethyl ketone; esters, e.g. methyl and ethyl acetate, ethyl formate and methyl propionate; and halogenated hydrocarbons, e.g. chloroform, trichloroethylene and chlorobenzene. Mixtures of these and other solvents can likewise be employed. Of these, water is preferred.

The substrate material is left in the polyvinylpyrrolidone solution long enough to uniformly coat the surfaces of the adsorbent, e.g. from about 15 minutes to 5 hours or longer. After the adsorbent is coated, it is separated from the polyvinylpyrrolidone solution, e.g. by vacuum-filtration, and freed of any excess polymer, e.g. by washing with solvent. This procedure of soaking the adsorbent in the polyvinylpyrrolidone solution, vacuum-filtering, and washing can be repeated one or more times, depending on the intended purpose of use of the separating agent to be produced, i.e. depending on the desired degree of deactivation. After the last washing step, the coated substrate material is dried to remove residual solvent, e.g. between 20 and 140° C., preferably between 90 and 110° C., optionally under reduced pressure. Concomitantly with the drying process, a further polymerization of the adsorbed polyvinylpyrrolidone can take place, which polymerization can be regulated, e.g. by selection of the drying temperature. After drying, the polymer can no longer be removed from the substrate material by washing, e.g. with water.

The thus-obtained polyvinylpyrrolidone-modified adsorbents can be employed in a conventional manner for separations of mixtures, both by adsorption chromatography as well as gel chromatography. They demonstrate a marked superiority over adsorbents which are not coated with polyvinylpyrrolidone for the separation of aqueous solutions of sensitive biochemicals. Substances which ordinarily would be completely or partially adsorbed in an irreversible manner by the uncoated adsorbents are no longer retained, or retained to a substantially lesser degree by the chromatographic separating agents of this invention.

The separating capacity of the separating agents of this invention usually is equal or nearly equal to that of the uncoated adsorbents.

The following examples illustrate a process for the preparation of the novel adsorbents of this invention and demonstrate the advantages of the products of this invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

100 g. of a silica gel having an average pore diameter $\phi=616$ A. (calculated according to the formula $\phi=4 V_p/O_{sp}$) wherein $V_p$ (pore volume) $=0.77$ cm.³/g. and $O_{sp}$ (specific surface) equals 50 m.²/g. (based on the assumption of cylindrical pores and a particle size of 0.05–0.20 mm.) is dispersed in 1 liter of a 4% aqueous solution of a polyvinylpyrrolidone having a K value of 17. After one hour, the reaction mixture is vacuum-filtered, washed with 1 liter of water, and the thus-obtained silica gel product is once again dispersed in 1 liter of fresh polyvinylpyrrolidone solution. After another hour, the reaction mixture is vacuum-filtered, washed three times with 1 liter portions of water, and the silica gel product is first dried by suction and then dried for 24 hours in a drying chamber at 100° C. The thus-dried silica gel product contains 2.2% carbon and 0.4% nitrogen, which values correspond to a polyvinylpyrrolidone content of 3.3 g. per 100 g. of separating agent.

A chromatographic column 1.5 cm. by 45 cm. is filled with a slurry of the thus-prepared silica gel product in water. A solution of 20 mg. of azocasein in 2 ml. of water is applied to the column and eluted with water. The yellow substance passes through the column without leaving any residual coloring on the column and is separated into two components after 31 ml. and 39 ml., respectively, of eluate is collected. Ultraviolet spectrographic examining of the eluate (at 277.5 nanometers) shows that 93% of the starting azocasein its eluted. In a comparative experiment using the same silica gel prior to treatment with polyvinyl pyrrolidone under otherwise identical conditions, azocasein is separated into two components having the same elution volumes, but only 39.6% of the charged azocasein is recovered in the eluting medium. In this instance, the column is strongly colored in the upper portion with the yellow color of the azocasein.

EXAMPLE 2

50 g. of sintered kieselguhr having a grain size of 0.15 to 0.2 mm. is introduced into 1 liter of a 4% aqueous solution of a polyvinylpyrrolidone having a K value of 19. After two hours, the mixture is vacuum-filtered, the filter cake is washed with 1 liter of water, and the washed solids are once again made up into a slurry with 1 liter of a fresh polyvinylpyrrolidone solution. After another hour, the mixture is again vacuum-filtered, washed three times with 1 liter portions of water, vacuum filtered and finally dried for 24 hours at 110° C. The thus-dried product contains 5.6% carbon and 1.1% nitrogen, which values correspond to a polyvinylpyrrolidone content of 8.7%.

The thus-obtained product is made into a slurry with a citrate/sodium hydroxide buffer solution (pH 5) containing 20.256 g. of citric acid monohydrate and 7.840 g. of sodium hydroxide per liter, and poured into a chromatographic column. 18.6 mg. of lysozyme is applied to the column and eluted with the same buffer solution. The entire amount of lysozyme is recovered in the eluting medium.

In a comparison experiment using the starting untreated kieselguhr, only 7.8 mg. of lysozyme (41.9%) is recovered in the eluting medium.

EXAMPLE 3

100 g. of porous glass having an average pore diameter of 200 A. is mixed with 1 liter of a 4% aqueous solution of a polyvinylpyrrolidone having a K value of 17. After one hour, the mixture is vacuum-filtered, washed with 1 liter of water, and the glass is once again allowed to stand for 1 hour in 1 liter of a fresh polyvinylpyrrolidone solution. Thereafter, the mixture is vacuum-filtered, the glass is washed three times with 1 liter portions of water and then dried at 100° C. for 24 hours. The thus-dried glass is washed three times with 1 liter portions of water values correspond to a polyvinylpyrrolidone content of 5.6%.

In order to determine the chromatographic separating behavior of the polyvinylpyrrolidone modified glass, 19.8 mg. of lysozyme is applied to a separating column packed with the thus-prepared separating agent dispersed in a citrate/sodium hydroxide buffer, and thereafter eluted with same buffer solution. The entire amount of lysozyme applied to the column is recovered in the eluate.

The same amount of lysozyme is almost completely irreversibly adsorbed by a column packed with the same porous glass which had not been coated with polyvinylpyrrolidone.

EXAMPLE 4

50 g. of magnesium trisilicate of a particle size of 0.05 to 0.2 mm. is made into a slurry in 250 ml. of a 4% aqueous solution of a polyvinylpyrrolidone having a K value of 17. The mixture is allowed to stand for one hour and then vacuum-filtered. The filter cake is washed with 125 ml. of water and then once again allowed to stand for one hour in 125 ml. of fresh polyvinylpyrrolidone solution. Thereafter, the mixture is vacuum-filtered, the filter cake is washed with 375 ml. of water, dried by suction and then dried for 24 hours at 110° C.

A column 50 cm. by 1.5 cm. is filled with a slurry of the polyvinylpyrrolidone coated product in water. 18.3 mg. of azocasein in 2 ml. of water is applied to the column and eluted with water. 10.5 mg. (57.3%) of azocasein is recovered in the eluting medium. The eluted column exhibits a slight yellow color.

In a comparison experiment using the same column filled with untreated starting magnesium trisilicate, the entire amount of azocasein is retained on the column, the upper portion of which exhibits a strongly yellow color.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope therof, can make various changes and modifications of the invention to adapt it to various usages and conditions.

What is claimed is:

1. A partially deactivated silicon dioxide-containing particulate adsorbent having a coating of polyvinylpyrrolidone on the active surfaces thereof, said coating constituting from about 0.1 to 15% by weight of the coated adsorbent.

2. A silicon dioxide-containing adsorbent according to claim 1, wherein the adsorbent is selected from the group consisting of silica gel, kieselguhr, porous glasses and insoluble silicates.

3. A silicon dioxide-containing adsorbent according to claim 1, wherein the active surfaces of the adsorbent are coated with about a monomolecular layer of polyvinylpyrrolidone.

4. A silicon dioxide-containing adsorbent according to claim 1 having an average pore diameter of between 50 and 3,000 A. and coated with a polyvinylpyrrolidone having a K value between about 11 and 90.

5. A silicon dioxide-containing adsorbent according to claim 4, wherein said adsorbent is silica gel coated with from about 1 to 10% by weight of polyvinylpyrrolidone having a K value between 17 and 25.

6. A process for the production of a silicon dioxide-containing adsorbent according to claim 1, which comprises coating the surface of a surface active silicone dioxide-containing adsorbent in an amount which reduces the adsorbtive properties of the adsorbent by mixing the adsorbent with a solution of polyvinylpyrrolidone.

7. A process according to claim 6, wherein the surface of the adsorbent is coated with a solution containing about 1 to 25 g. of polyvinylpyrrolidone per 100 ml. of solution.

8. A process according to claim 7, wherein the polyvinylpyrrolidone has a K value of from 11 to 90.

9. A process according to claim 7, wherein the solvent for the polyvinylpyrrolidone is water.

10. A process according to claim 6 which comprises the step of drying the adsorbent coated with polyvinylpyrrolidone at a temperature between 90 and 110° C.

11. A process for the chromatographic separation with a column packed with a silicon dioxide-containing adsorbent of a solution of a mixture comprising a component desired to be isolated which is adversely affected by conventional silicon dioxide-containing adsorbents, which comprises conducting the chromatographic separation using a coulmn packed with a silicon-dioxide adsorbent according to claim 1.

12. A process according to claim 11 wherein the component desired to be isolated is a biochemical in an aqueous solution.

References Cited

UNITED STATES PATENTS 3,116,161  12/1963  Purnell _____ 55—386X
3,271,930   9/1966  Ewald et al. _____ 55—67
3,340,085   9/1967  Halasz et al. _____ 55—386X J. L. DECESARE, Primary Examiner U.S. Cl. X.R.

210—198; 55—386